Jan. 4, 1955 R. W. HOMPE ET AL 2,698,707
DEVICE FOR INSERTING PACKING MATERIAL INTO CONTAINERS
Filed May 31, 1951 4 Sheets-Sheet 1

INVENTOR.
ROBERT W. HOMPE
CLAUDE C. HALL &
GEORGE E. MARTELL
BY
*Busser and Harding*
ATTORNEYS.

Jan. 4, 1955     R. W. HOMPE ET AL     2,698,707

DEVICE FOR INSERTING PACKING MATERIAL INTO CONTAINERS

Filed May 31, 1951     4 Sheets-Sheet 3

INVENTOR.
ROBERT W. HOMPE
CLAUDE C. HALL &
GEORGE E. MARTELL
BY

ATTORNEYS.

# United States Patent Office 2,698,707
Patented Jan. 4, 1955

2,698,707
DEVICE FOR INSERTING PACKING MATERIAL INTO CONTAINERS

Robert W. Hompe, Ithan, and Claude C. Hall, Philadelphia, Pa., and George E. Martell, Bellmawr, N. J., assignors to Smith, Kline & French Laboratories, Philadelphia, Pa., a corporation of Pennsylvania Application May 31, 1951, Serial No. 229,202

1 Claim. (Cl. 226—19)

This invention relates to a machine for inserting an inert, dry, lightweight packing such as cotton, wool, glass wool, asbestos fibers or synthetic fibers into containers which contain pills, capsules, tablets or other frangible materials and it may also be used to insert packing material into containers where it is desirable to restrict motion of any material in a container.

Heretofore, the insertion of packing into bottles has been effected by the use of standard machines. These standard machines are deficient in that they tear a quantity of packing, usually cotton, from a continuous roll, insert it into a bottle and tamp it therein. In performing this operation, the quantity of cotton torn from the continuous roll by the machine is not constant, and successive pieces of cotton inserted into successive bottles may vary greatly in size and weight. Hence, when a large piece of cotton is tamped into a small bottle the result is that fragile pills or tablets in the bottle are crushed and rendered unfit for sale. This results in a large percentage of rejections. Another deficiency of the rotary type machines presently in use is that they require several tamping operations to properly place the cotton in the bottle. The rotary type machines presently in use are suitable for inserting cotton into large bottles but where small bottles are involved, they are not entirely satisfactory, due to the breaking of pills or tablets in the bottles and the frequent breaking of the bottles themselves.

It is necessary that the packing inserting operation be performed by machines, since the manual handling of small bottles at a speed satisfactory for production in the required quantities is not obtainable. Also, manual insertion of the packing requires considerable labor in order to maintain production.

It is, therefore, a primary object of this invention to provide a machine for inserting packing into containers in which a quantity of packing material is automatically cut from a continuous strip and inserted automatically into a container.

It is a further object of this invention to provide a machine for inserting packing into containers in which all of the pieces of packing are of uniform size and weight.

It is a further object of this invention to provide a machine for inserting packing into containers containing pills, tables or other frangibles in which the operation is performed in a uniform manner and crushing of the pills, tablets or other frangibles is eliminated.

It is a further object of this invention to provide a machine for inserting packing into containers containing pills, tablets or other frangibles in which the operation is performed automatically and at high speed.

It is a further object of this invention to provide a machine for inserting packing into small bottles of the type which contain from 6 to 8 small tablets or pills, and by virtue of which the packing inserting operation may be performed without breakage of the small bottles or crushing of the fragile tablets therein.

The preferred embodiment of the invention is illustrated by the accompanying drawings, in which.

Figure 1:
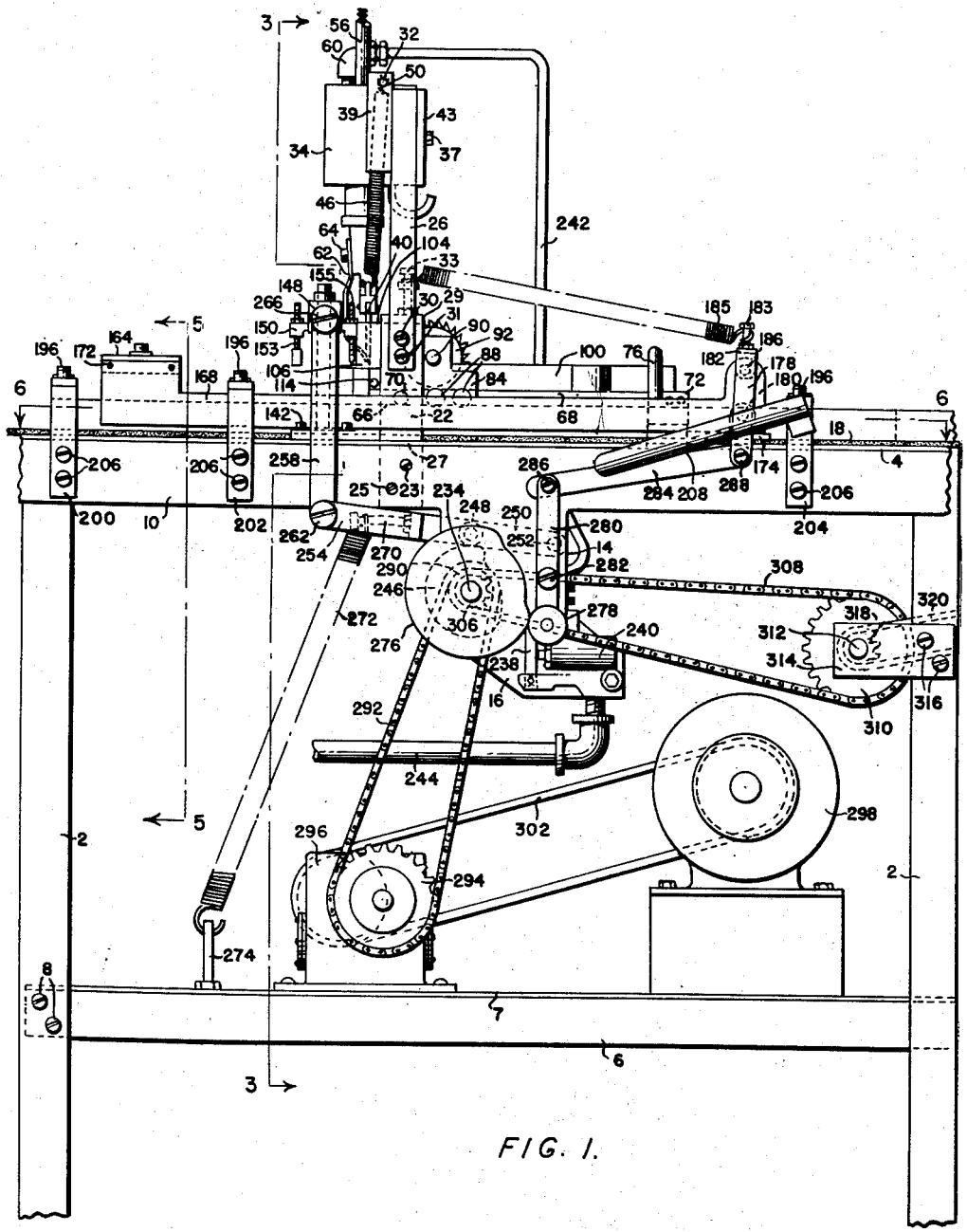
Figure 1 is a right side view of the device of this invention.

Referring specifically to Figure 1, the device is shown mounted on a table having upstanding legs 2 which may be channel members and having a plate 4 at the top thereof. Mounted intermediate the ends of the upstanding channel members 2 is a shelf 6 composed of channel members having a plate 7 which is secured to the top portions thereof, as by screws, welding or other convenient means. Channel members 6 may be secured to upstanding channel members 2 as by bolts 8. Abutting against the lower edge of plate 4 and being welded to channel members 2 are side rails 10 and 12 which may be formed of bar stock. Side rails 10 and 12 extend the entire length of the device and are shown broken off in the drawings due to space limitations. Side rails 10 and 12 have flanges 14 and 16 depending therefrom, as best shown in Figure 3.

Lying flat on plate 4 and traveling from right to left as viewed in Figure 1, across plate 4 is one reach of an endless belt 18 which supports a plurality of bottles or vials 20. The endless belt is driven in timed relationship to the operation of the cotton inserting mechanism by a means to be hereinafter described, so that the endless belt continually presents bottles beneath the cotton inserting mechanism.

Figure 3:
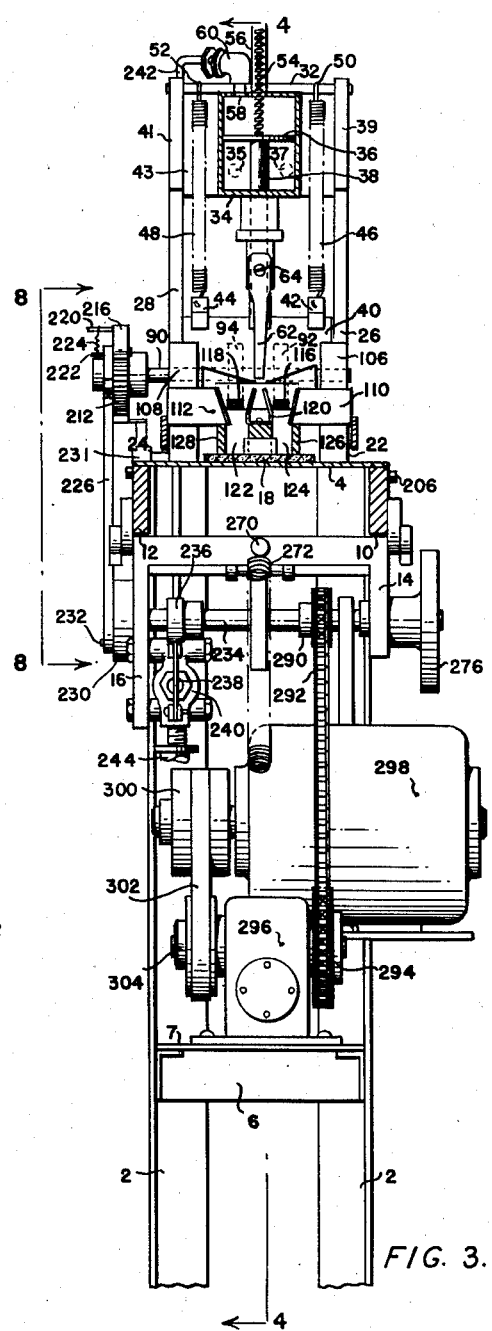
Figure 3 is a front view of the device of this invention.

As best shown in Figures 1 and 3, a pair of upstanding brackets 22 and 24 are secured to side rails 10 and 12 respectively, as by bolts 23 and 25. Brackets 22 and 24 pass through openings in top plate 4, as shown at 27 in Figure 1. Secured to the upper ends of brackets 22 and 24 is transverse plate 29 which extends between said brackets and has stud 33 projecting upwardly therefrom. Secured to brackets 22 and 24 are upstanding members 26 and 28 which may be secured to brackets 22 and 24 as by bolts 30 and 31. Mounted transversely between upstanding brackets 26 and 28 at the top thereof, is a plate 43, which is secured to brackets 26 and 28 by any convenient means such as welding, said plate supporting compressed air cylinder 34 by any convenient means such as bolts 35 and 37. Mounted on the left-hand side of brackets 26 and 28, as viewed in Figure 1, are two metal strips 39 and 41 having transverse rod 32 mounted thereon at the top of said strips. Compressed air cylinder 34 has a piston 36 therein attached to piston rod 38, said rod being attached at its lower end to knife blade 40. Mounted at either side of knife blade 40 are brackets 42 and 44 each of which has one end of tension springs 46 and 48 respectively attached thereto. Tension springs 46 and 48 are attached at their upper ends to transverse rod 32 as shown at 50 and 52. Attached to the upper side of piston 36 is tension spring 54, the other end of which is attached to cap 55 mounted on cylinder 56. Compressed air cylinder 34 has an opening 58 in the top thereof into which is secured pipe fitting 60. Secured to the front of piston rod 38, as viewed in Figure 3, is a tension spring 62 which may be secured to piston rod 38 as by machine bolt 64. Spring 62 at its lower end abuts against knife blade 40. Brackets 22 and 24 are provided with milled shoulders on the interior surfaces thereof as shown in dotted lines at 66 in Figure 1, upon which shoulders rest the left-hand portion of plate 68. Plate 68 is secured to brackets 22 and 24 by bolts 70, as shown in Figure 1. Plate 68 at its right-hand end, as viewed in Figure 1 is secured to plate 4 by brackets 72 and 74. Secured to brackets 72 and 74 are two upstanding rails 76 and 78 which serve as guides for two strips of cotton being indicated by dotted lines at 80 and 82. Secured to plate 68 adjacent brackets 22 and 24 are brackets 84 and 86 which may be secured to plate 68 as by bolts 88. Journalled in brackets 84 and 86 is a transverse rod 90 upon which are fixedly mounted two corrugated rolls 92 and 94.

Figure 2:
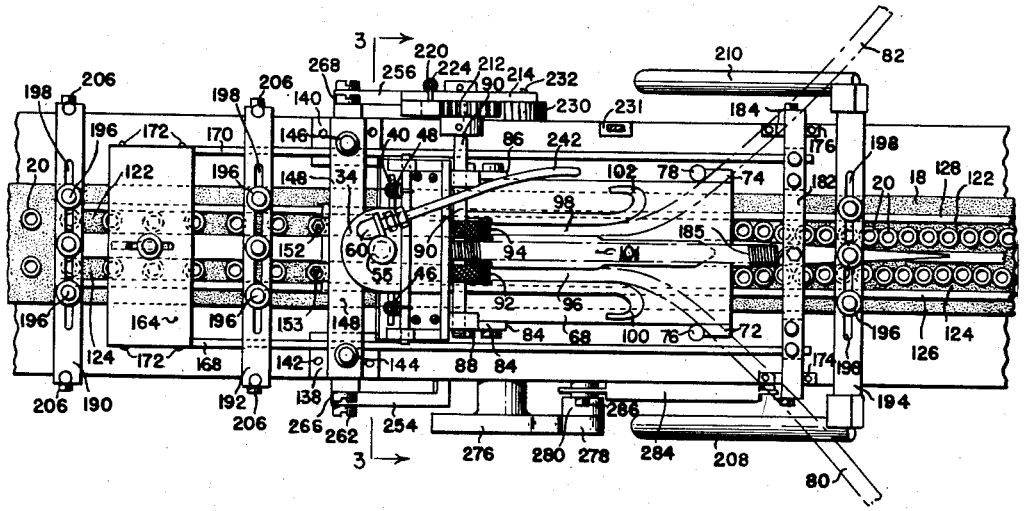
Figure 2 is a top view of the device of this invention.

As best shown in Figure 2, corrugated rolls 92 and 94 have their lower sides received in channels 96 and 98, said channels being formed by the three members 100, 101 and 102. Members 100 and 102 are formed with curved ends at the right-hand ends thereof, as viewed in Figure 2. Members 100, 101 and 102 may be secured to plate 68 by any convenient means. Mounted to the left of brackets 22 and 24, as viewed in Figure 1, is a two-piece block 104 and 106 having a slot milled in the faces of the two halves to accommodate the side of knife blade 40. As best viewed in Figure 3, a similar block is provided on the opposite side of knife blade 40, as shown at 108. Mounted on blocks 104 and 108 are two guide arms 110 and 112 which may be secured to blocks 104 and 108 as by pin 114, as shown in Figure 1.

Figure 6:
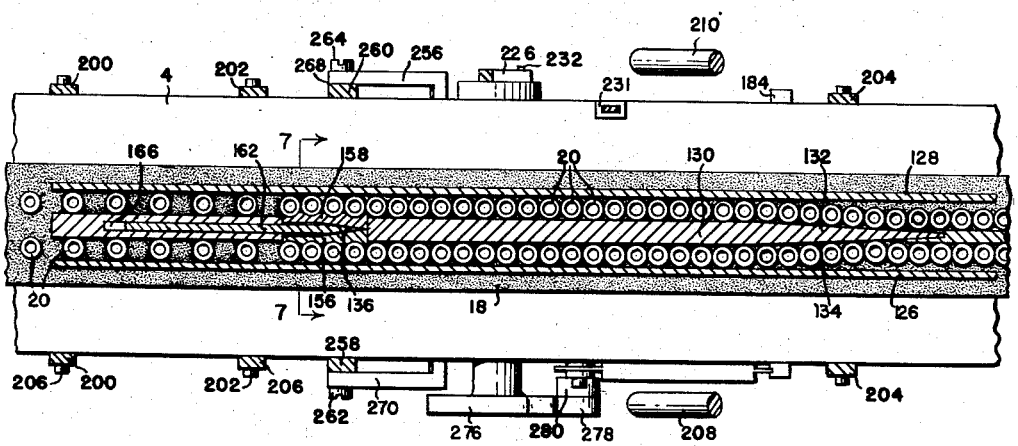
Figure 6 is a top sectional view of the device of this invention, taken along line 6—6 of Figure 1.

As best seen in Figure 3, channels 96 and 98 terminate at their left-hand ends in openings 116 and 118, directly below knife blade 40. Positioned just in front of openings 116 and 118 is a U-shaped guide member 120 which serves to keep the bottles in line and also to properly direct the cut cotton strips. Channels 122 and 124 are provided for the reception of a series of bottles which are to have cotton inserted therein. As best seen in Figure 6, channels 122 and 124 are formed by outside rails 126 and 128 having center dividing rail 130 interposed therebetween. Center dividing rail 130 has sloping sides 132 and 134 in order to properly position bottles 20 between rails 126, 128, and 130 so that they will be properly received by a gripping mechanism 136.

Figure 7:
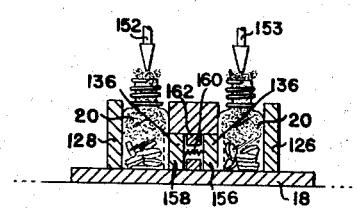
Figure 7 is a fragmentary view of a portion of the device of this invention taken along line 7—7 of Figure 6.
Figure 4:
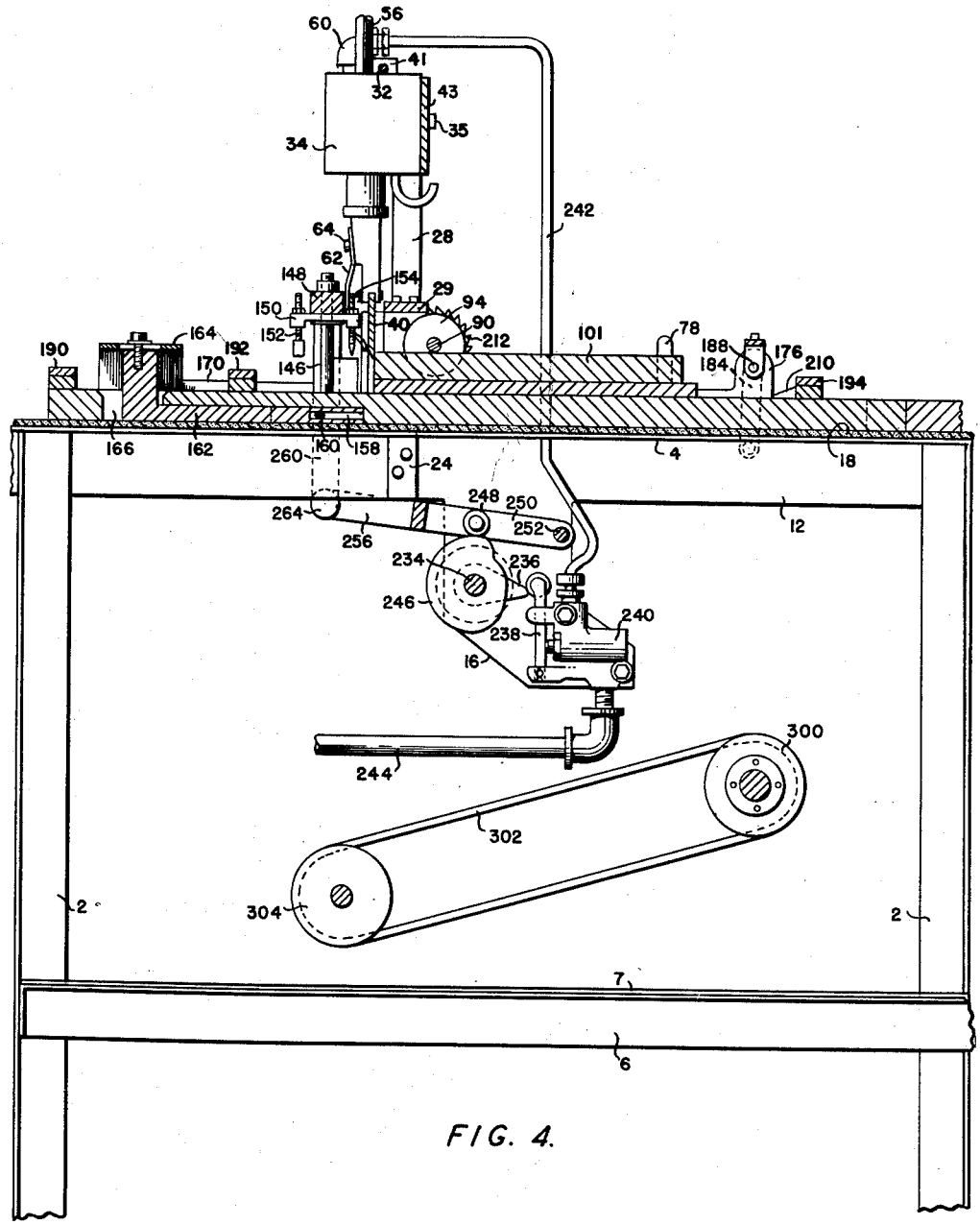
Figure 4 is a right side view of the device of this invention in section taken along line 4—4 of Figure 3.

As best seen in Figure 2, brackets 138 and 140 are affixed to top plate 4 as by bolts 142 and support upstanding rails 144 and 146. As best seen in Figures 2 and 4, rails 144 and 146 support transverse bar member 148, said bar member being slidably supported on said rails. Intermediate the length of transverse bar member 148 is a bracket 150 supporting four tamping screws. The two tamping screws 152 and 153 mounted to the left of transverse bar 148, as viewed in Figure 4, are identical and have wedge-shaped heads at their lower ends thereof. The two tamping screws 154 and 155 mounted to the right of transverse bar 148, as viewed in Figure 4, are identical and have pointed lower ends. Transverse bar 148 is mounted directly above gripping mechanism 136, as best shown in Figures 2, 6 and 7. Gripping mechanism 136 consists of two plates 156 and 158 having their outer sides formed in a succession of arcuate indentations which correspond to the curvature of the bottles to be gripped. Mounted between plates 156 and 158 is a tension spring 160 which serves to bias plates 156 and 158 together. Interposed between plates 156 and 158 is a slotted cam member 162 which, when moved to the right, as viewed in Figure 6, serves to bias plates 156 and 158 outwardly thus effectively gripping bottles 20 between plates 156 and 158 and side rails 126 and 128.

As best seen in Figure 4, slotted cam member 162 is affixed at its left-hand end to plate 164. Rail 130 has a slot 166 at the left-hand end thereof, as viewed in Figures 4 and 6, so that slotted cam member 162 may reciprocate therein.

As best seen in Figure 2, two side rails 168 and 170 are affixed to crossplate 164 as by bolts 172 and are supported above the surface of plate 4 thereby. Near the right-hand end of the device, as viewed in Figure 1, are brackets 174 and 176 which are secured to top plate 4. As best seen in Figure 1, a lever 178 is mounted on bracket 174 by a pin 180. At the top of lever 178 is a transverse bar 182 having stud 183 projecting upwardly therefrom to which is affixed one end of tension spring 185, the other end of said tension spring being secured to stud 33. The opposite end of transverse bar 182 is secured to lever 184 which is rotatably affixed to bracket 176 at its lower end. Rails 168 and 170 are affixed to transverse lever 182 by pins 186 and 188.

Figure 5:
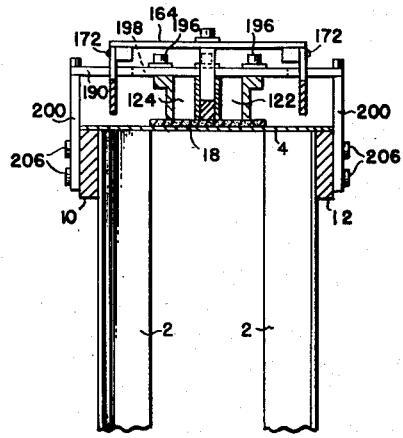
Figure 5 is a sectional view of the left-hand portion of the device as viewed in Figure 1, taken along line 5—5 of Figure 1.

Mounted transversely of the device, as best seen in Figure 2, are a series of members 190, 192 and 194 to which are affixed rails 126, 128 and 130. As will be seen from Figures 2 and 5, the position of rails 126 and 128 may be varied with respect to member 130 by loosening machine bolts 196 which are attached to rails 126, 128 and 130 and moving machine bolts 196 in slots 198. By virtue of this construction, bottles of different sizes may be accommodated in one machine by making minor structural changes. Members 190, 192 and 194 are secured to side rails 10 and 12 as by identical brackets 200, 202 and 204 having bolts 206 therein. Mounted at the ends of member 194 are two arms 208 and 210 which extend downwardly to the left at an angle, as viewed in Figure 1. The purpose of these arms is to properly guide the two strips of cotton into channels 96 and 98 against upstanding guides 76 and 78.

Figure 8:
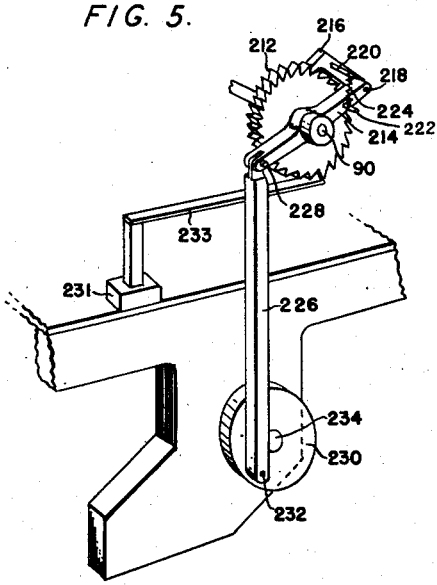
Figure 8 is a fragmentary view of a portion of the device of this invention taken along line 8—8 of Figure 3.

As best viewed in Figure 8, cross-shaft 90, having corrugated rolls 92 and 94 mounted thereon, has ratchet wheel 212 secured to the left-hand end thereof, as viewed in Figure 3. Ratchet wheel 212 may be secured to cross-shaft 90 as by splining or keying or other convenient means. A portion of cross-shaft 90 projects through ratchet wheel 212 and has lever arm 214 rotatably mounted thereon. At the right-hand end of lever arm 214, as viewed in Figure 8, is ratchet pawl 216 being secured to lever 214 by pin 218. Pins 220 and 222 project outwardly from the surface of ratchet pawl 216 and lever arm 214 respectively, and have tension spring 224 affixed therebetween, the purpose of this tension spring being to hold pawl 216 in engagement with ratchet wheel 212. Affixed to the left-hand end of lever arm 214, as viewed in Figure 8, is connecting link 226 which may be secured to lever 214 as by pin 228. Link 226 is secured at its lower end to crank 230 as by pin 232. Mounted on table 4 as by bracket 231, is a stop member 233 formed of spring stock which engages ratchet wheel 212 at the lower side thereof and prevents ratchet wheel 212 from turning in a clockwise direction, as viewed in Figure 8. Crank wheel 230 is mounted on the left-hand end of cross-shaft 234 as viewed in Figure 3. Cross-shaft 234 is journalled in depending flanges 14 and 16. As best seen in Figure 4, cross-shaft 234 has a cam 236 affixed thereto for rotation therewith, said cam engaging actuating arm 238 of air valve 240. Extending upwardly from air valve 240 is compressed air line 242 which is joined at its upper end to pipe fitting 60. At the lower end of air valve 240, as viewed in Figure 4, is a pipe 244 leading to any convenient source of supply of compressed air. Mounted to the right of cam 236, as viewed in Figure 3, is a cam 246, as best shown in Figure 4, which is mounted on cross-shaft 234 for rotation therewith, said cam being engaged by a cam follower 248 on lever arm 250, said lever arm being rotatably secured to flange 16 as by pin 252. Lever arm 250 is formed at its left-hand end into a yoke having two arms 254 and 256. Secured to the ends of yoke arms 254 and 256 are connecting links 258 and 260, the connecting links being affixed to said yoke arms as by pins 262 and 264, respectively. At their upper ends, connecting links 258 and 260 are secured to transverse bar 148 as by pins 266 and 268. Mounted intermediate the arms 254 and 256 of lever 250 is a stud 270, as best shown in Figure 1, having one end of a tension spring 272 secured thereto, the other end of said tension spring being secured to bracket 274 which is mounted on plate 7. On the right-hand end of cross-shaft 234, as viewed in Figure 3, is mounted cam 276. Cam 276 is engaged by cam follower 278, said cam follower being mounted at the lower end of lever 280, as viewed in Figure 1, lever 280 being secured to depending flange 14 by pin 282. At its upper end, as viewed in Figure 1, lever 280 is secured to connecting link 284 by pin 286. The other end of connecting link 284 is secured to lever arm 178 by pin 288.

Mounted on cross-shaft 234 is a sprocket 290 being engaged by chain 292, chain 292 being driven from sprocket wheel 294 by reduction gear 296. Reduction gear 296 is driven by electric motor 298 driving through pulley 300, belt 302 and driven pulley 304.

Also mounted on cross-shaft 234 is sprocket wheel 306 which drives chain 308 and driven sprocket 310. Sprocket 310 is mounted on shaft 312, said shaft being journalled in a pair of brackets 314 affixed to upstanding channel members 2, as by bolts 316. Also mounted on shaft 312 is small sprocket 318 which drives chain 320, said chain engaging a second sprocket wheel, not shown, which, in turn, drives one of the rolls, also not shown, upon which is mounted endless belt 18.

The operation of the device is as follows:

Motor 298 is started by connecting it to any convenient source of current, and due to the driving connection from motor 298 through reduction gear 296, cross-shaft 234, sprockets 306, 310, 318 and chains 292, 308 and 320, endless belt 18 is driven from right to left across supporting plate 4, as viewed in Figures 1, 2, 4 and 6. A plurality of small bottles, after passing through a filling operation and having the desired quantity of pills or tablets therein, are fed upon the right-hand end of endless belt 18, as viewed in Figures 1, 2, 4, and 6, and are carried by endless belt 18 into channels 122 and 124 between rails 126, 128 and 130. As the bottles are carried between rails 126, 128 and 130, sloping shoulders 132 and 134 of dividing rail 130 position the bottles against outer rails 126 and 128 so that they will be properly centered beneath tamping screws 152, 153, 154 and 155. As bottles come into engagement with gripping mechanism 136, it will be appreciated that due to the rotation of cam 276 on cross-shaft 234 and the action of cam follower 278 as cam 276 rotates in contact therewith, that lever arm 280 will pivot upon fulcrum point 282 thereby pivoting lever arms 178 and 184 about fulcrum points 180 and 188 due to the fact that levers 178 and 184 are joined by transverse bar 182. Thus as levers 178 and 184 pivot about their fulcrum points, rails 168 and 170 affixed to said levers at 186 and 188, respectively, are caused to reciprocate above the top of table 4 since rails 168 and 170 are affixed at their left-hand ends to plate 164 which is, in turn, secured to slotted cam member 162. As best shown in Figure 4, slotted cam member 162 is caused to reciprocate with rails 168 and 170 due to the action of cam 276, cam follower 278 and return spring 185. As slotted cam member 162 reciprocates, the right-hand end of said cam member, as viewed in Figure 6, being formed in a wedge configuration, is forced between gripping members 156 and 158 which are thus forced outwardly so that their accurately shaped faces engage bottles passing through channels 122 and 124 and hold them against rails 126 and 128 while endless belt 18 slips beneath said bottles during the time that they are gripped by gripping mechanism 136.

Driven in timed relationship to the rotation of cam 276, due to the fact that it is mounted on the same shaft 234, is crank member 230, as best seen in Figure 8. As crank member 230 rotates with shaft 234, ratchet wheel 212 is caused to rotate through a desired number of degrees due to the action of connecting link 226, lever 214 and ratchet pawl 216 connected to lever 214. It will be appreciated by those skilled in the art that ratchet wheel 212 may be driven through any desired number of degrees by merely changing the mechanical linkage which drives the ratchet pawl. Ratchet wheel 212 is mounted on cross-shaft 90 to which are affixed corrugated rolls 92 and 94. Hence, as ratchet wheel 212 is driven through the desired number of degrees per revolution of cross-shaft 234, cross-shaft 90 will also be driven through the same number of degrees as ratchet wheel 212. Corrugated rolls 92 and 94 will be driven through the same number of degrees as ratchet wheel 212, since they are fixedly secured to cross-shaft 90. The intermittent rotation of corrugated rolls 92 and 94 forces cotton strips 80 and 82 through channels 96 and 98, terminating in openings 116 and 118, beneath knife blade 40 in successive increments.

The rotation of cross-shaft 234 also rotates cam member 236 which engages actuating lever 238 on air valve 240. Cam member 236 is so arranged as to actuate air valve 240 after corrugated rolls 92 and 94, in their intermittent rotation, have forced one inch of rolled cotton beneath knife blade 40. When air valve 240 is operated by cam 236 and actuating arm 238, compressed air is admitted through opening 58 in compressed air cylinder 34 thereby driving piston 36, piston rod 38 and knife blade 40 downwardly, as viewed in Figure 3, and thereby cutting off two one-inch strips of cotton projecting through openings 116 and 118. Knife blade 40 is then returned to its original position by the action of tension springs 46, 48 and 56 as the compressed air is exhausted from cylinder 34.

Also operating in timed relationship to the bottle gripping mechanism, cotton feeding means, and cotton cutting means is cam 246 mounted on cross-shaft 234. Cam 246 engages cam follower 248 on lever 250. Cam follower 248 engages the low side of cam 246 in timed relationship to the cutting of the cotton so that as soon as the cotton strip is cut, lever 250 pivots about pin 252 due to cam follower 248 engaging the low side of cam 246. Connecting links 258 and 260 are pulled downwardly due to the action of spring 272 secured to stud 270 and the two cut cotton strips are inserted in two bottles by means of the two pins 154 and 155 engaging the two cotton strips while the two bottles are held in the right-hand end of the gripping mechanism 136 as shown in Figures 6 and 7.

The bottles in which the cotton has been partially inserted by pins 154 will pass to the left-hand end of the gripping mechanism 136, as shown in Figure 6, in succeeding cycles of operation of the machine and the cotton will be tamped in the two bottles held in the left-hand end of the gripping mechanism by wedge-shaped tamping members 152 and 153.

As the bottles are released from the clamping mechanism 136 after having the cotton tamped therein by tamping members 152 and 153, they are conveyed by endless belt 18 to a capping mechanism, not shown, which is mounted in series with the device of the present invention.

It will be appreciated by those skilled in the art that any number of channels for containers may be provided by duplicating the necessary parts of the device, the foregoing description being by way of example only.

From the foregoing description it will be appreciated that the instant invention performs a tedious manual operation automatically and with great speed. Further, the operation is performed in only two operations of the cotton inserting mechanism. The cotton is first inserted by the two pointed screw members 154 and 155 and then tamped by the two wedge-shaped members 152 and 153. This construction eliminates the successive tamping operations required in the rotary type machines presently in use, over which the instant device constitutes a vast improvement.

It will be apparent to those skilled in the art that various modifications may be made within the scope of this invention, and the scope of the invention is to be restricted only in accordance with the appended claim.

What is claimed is:

A device for inserting packing material into containers which comprises a belt conveyor adapted to carry containers, a pair of side guide rails above said conveyor, a center dividing rail between said side guide rails, container arresting mechanism comprising a pair of upstanding gripping plates mounted in said dividing rail, spring means secured to said plates to bias the plates together, cam means to intermittently force said plates apart to grip containers between said plates and said side guide rails, means to intermittently feed in uniform successive increments a pair of strips of packing material substantially horizontal and above said container arresting means, a knife adapted to cut said strips, means to actuate said knife after each actuation of said feeding means, a pair of plungers adjacent said knife, and means to reciprocate said plungers to engage the horizontal cut portions of the strips of packing material and force them downwardly into the containers being held by said container arresting means.

References Cited in the file of this patent
UNITED STATES PATENTS

| | | |
|---|---|---|
| 2,109,407 | Westin | Feb. 22, 1938 |
| 2,304,932 | Lakso | Dec. 15, 1942 |
| 2,412,089 | Kelly | Dec. 3, 1946 |